US011829010B2

(12) United States Patent
Chien

(10) Patent No.: US 11,829,010 B2
(45) Date of Patent: Nov. 28, 2023

(54) OPTICAL WAVEGUIDE

(71) Applicant: Coretronic Corporation, Hsin-Chu (TW)

(72) Inventor: Hung-Ta Chien, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/730,230

(22) Filed: Apr. 27, 2022

(65) Prior Publication Data
US 2022/0373853 A1 Nov. 24, 2022

(30) Foreign Application Priority Data

May 20, 2021 (CN) .......................... 202110549369.8

(51) Int. Cl.
*G02F 1/225* (2006.01)
*F21V 8/00* (2006.01)
(Continued)

(52) U.S. Cl.
CPC ........... *G02F 1/225* (2013.01); *G02B 6/0015* (2013.01); *G02B 6/0035* (2013.01);
(Continued)

(58) Field of Classification Search
CPC .......... G02B 19/0004; G02B 2027/012; G02B 2027/0178; G02B 2027/0101;
(Continued)

(56) References Cited

U.S. PATENT DOCUMENTS 5,076,664 A 12/1991 Migozzi
8,743,464 B1 6/2014 Amirparviz
(Continued)

FOREIGN PATENT DOCUMENTS

CN 1784630 6/2006
CN 104536138 A * 4/2015 ......... G02B 27/0101
(Continued)

OTHER PUBLICATIONS

"Office Action of Related U.S. Appl. No. 17/233,521", dated Jul. 22, 2022, p. 1-p. 10.
(Continued)

*Primary Examiner* — Ryan A Lepisto
*Assistant Examiner* — Erin D Chiem
(74) *Attorney, Agent, or Firm* — JCIPRNET

(57) ABSTRACT

An optical waveguide, including a first structural layer, a second structural layer, a first light-guiding element, and multiple second light-guiding elements, is provided. The light-guiding elements are a partially penetrating and partially reflective layer. Multiple first sub-beams in an image beam are transmitted in the first or the second structural layer by a coupling inclined surface. Each first sub-beam forms multiple second sub-beams after being transmitted by the first or the second light-guiding elements. Some of the second sub-beams are coupled out of the optical waveguide by the second light-guiding elements, thereby enabling the image beam to expand in a first direction. For a portion of the visible light waveband, a trend of transmittance of the partially penetrating and partially reflective layer changing as a wavelength increases is opposite to a trend of transmittance of the first structural layer or the second structural layer changing as the wavelength increases.

17 Claims, 14 Drawing Sheets

(51) Int. Cl.
*G02B 27/01* (2006.01)
*G02B 6/10* (2006.01)

(52) U.S. Cl.
CPC ............. *G02B 6/0046* (2013.01); *G02B 6/10* (2013.01); *G02B 27/0101* (2013.01)

(58) Field of Classification Search
CPC .... G02B 27/00; G02B 27/01; G02B 27/0172; G02B 27/0944; G02B 5/1814; G02B 5/1819; G02B 5/1857; G02B 5/1866; G02B 6/0046; G02B 6/10; G02B 6/0035; G02B 6/0015; G02F 1/225
See application file for complete search history.

(56) References Cited

U.S. PATENT DOCUMENTS

| | | | |
|---|---|---|---|
| 9,435,955 | B2 | 9/2016 | Dubroca et al. |
| 9,575,317 | B2 * | 2/2017 | Sarayeddine ........ G02B 6/0056 |
| 9,726,890 | B2 | 8/2017 | Akutsu et al. |
| 10,422,997 | B2 | 9/2019 | Hung et al. |
| 10,670,876 | B2 | 6/2020 | Popovich et al. |
| 10,690,916 | B2 | 6/2020 | Popovich et al. |
| 10,718,946 | B2 | 7/2020 | Yang et al. |
| 2007/0217008 | A1 * | 9/2007 | Wang .................... G02B 5/3025 359/485.05 |
| 2016/0041387 | A1 | 2/2016 | Valera et al. |
| 2017/0285346 | A1 | 10/2017 | Pan |
| 2017/0315358 | A1 | 11/2017 | Masuda |
| 2018/0059306 | A1 | 3/2018 | Pan et al. |
| 2018/0203236 | A1 | 7/2018 | Shih et al. |
| 2018/0284439 | A1 | 10/2018 | Vallius et al. |
| 2018/0299678 | A1 | 10/2018 | Singer et al. |
| 2018/0322845 | A1 | 11/2018 | Machida |
| 2019/0094445 | A1 | 3/2019 | Meng et al. |
| 2019/0129085 | A1 | 5/2019 | Waldern et al. |
| 2019/0346597 | A1 * | 11/2019 | Ukuda ................. G02B 5/1852 |
| 2020/0059589 | A1 | 2/2020 | Liu et al. |
| 2020/0158943 | A1 * | 5/2020 | Calafiore ............. G02B 5/1814 |
| 2020/0183171 | A1 | 6/2020 | Robaina et al. |
| 2020/0192122 | A1 | 6/2020 | Dobschal et al. |
| 2020/0225476 | A1 | 7/2020 | Urness et al. |
| 2022/0308350 | A1 * | 9/2022 | Sarayeddine ...... G02B 27/0172 |

FOREIGN PATENT DOCUMENTS

| | | |
|---|---|---|
| CN | 107991778 | 5/2018 |
| CN | 208188390 | 12/2018 |
| CN | 107290816 | 4/2020 |
| CN | 111201476 | 5/2020 |
| CN | 211698438 | 10/2020 |
| EP | 3351993 | 7/2018 |
| TW | 200736679 | 10/2007 |
| TW | 202016593 | 5/2020 |
| TW | 202022412 | 6/2020 |
| WO | 2019111927 | 6/2019 |

OTHER PUBLICATIONS

"Office Action of Related U.S. Appl. No. 17/233,521", dated Mar. 10, 2023, pp. 1-11.

* cited by examiner

OPTICAL WAVEGUIDE

CROSS-REFERENCE TO RELATED APPLICATION

This application claims the priority benefit of China application serial no. 202110549369.8, filed on May 20, 2021. The entirety of the above-mentioned patent application is hereby incorporated by reference herein and made a part of this specification.

BACKGROUND

Technical Field

This disclosure relates to an optical structure, and in particular to an optical waveguide.

Description of Related Art

With the advancement of display technologies and increasing consumer demand for high technological products, the technologies of virtual reality and augmented reality have gradually become more matured, in which a near-eye display (NED) is a display configured to realize these technologies. An optical waveguide used in the near-eye display is a key element in combining a virtual image and a real image, and the materials of a geometric optical waveguide may be divided into two categories: optical glass and optical polymer materials. An optical waveguide fabricated by glass cold processing technology may produce better image quality, but the process of fabricating such an optical waveguide is complicated. An optical waveguide formed by spraying a polymer material is more cost-effective, but absorptivity or transmittance of the polymer material changes with the wavelength. As a result, an image light travels in different optical paths while propagating in a waveguide made of a polymer material, different optical paths cause different color deviations, resulting in non-uniformed color in an image seen by a viewer.

The information disclosed in this background section is only for enhancement of understanding of the background of the described technology and therefore it may contain information that does not form the prior art that is already known to a person of ordinary skill in the art. Furthermore, the information disclosed in this section does not mean that one or more problems to be resolved by one or more embodiments of the disclosure were acknowledged by a person of ordinary skill in the art.

SUMMARY

This disclosure provides an optical waveguide, which may enable a coupled image beam with better color uniformity.

Other objectives and advantages of the disclosure may be further understood from the technical features disclosed in the disclosure.

An embodiment of the disclosure provides an optical waveguide having a first optical region and a second optical region that are adjacent, and is configured to transmit an image beam. The optical waveguide includes a first structural layer, a second structural layer, a first light-guiding element, and multiple second light-guiding elements. The first structural layer includes a coupling inclined surface, a first surface, and a second surface. The first surface is opposite to the second surface, and the coupling inclined surface connects the first surface to the second surface. The second structural layer includes a third surface and a fourth surface. The third surface is opposite to the fourth surface, and the third surface of the second structural layer is attached to the first surface of the first structural layer. The first light-guiding element is disposed on the first surface or the third surface at a position corresponding to the first optical region. The multiple second light-guiding elements are disposed on the first surface or the third surface at positions corresponding to the second optical region. The first light-guiding element and the multiple second light-guiding elements is a partially transmissive and partially reflective layer. Multiple first sub-beams in the image beam are transmitted in the first structural layer or the second structural layer by the coupling inclined surface. Each of the first sub-beams forms multiple second sub-beams after being transmitted by the first light-guiding element or the multiple second light-guiding elements. Some of the multiple second sub-beams are coupled out of the optical waveguide by the multiple second light-guiding elements, so that the image beam expands in a first direction. For a portion of the visible light waveband, a trend of transmittance of the partially penetrating and partially reflective layer changing as a wavelength increases is opposite to a trend of transmittance of the first structural layer or the second structural layer changing as the wavelength increases.

Based on the above, in an embodiment of the disclosure, for a portion of the visible light waveband, the trend of the transmittance of the first light-guiding element or the second light-guiding elements of the optical waveguide changing as the wavelength increases is opposite to the trend of the transmittance of the first structural layer or the second structural layer changing as the wavelength increases. Therefore, in the transmission process of the image beam in the optical waveguide, the absorptivity of light of each wavelength is designed to be roughly the same, so that the color deviation of the image beam being coupled out of the optical waveguide is reduced, and the color uniformity is increased, thereby providing the user with a better experience.

Other objectives, features and advantages of the disclosure can be further understood from the further technological features disclosed by the embodiments of the disclosure wherein there are shown and described preferred embodiments of the disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the descriptions, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top", "bottom", "front", "back" etc., is used with reference to the orientation of the figure(s) being described. The components of the disclosure can be positioned in a number of different orientations. As such, the directional terminology is used for purposes of illustration and is in no way limiting. On the other hand, the drawings are only schematic and the size of the components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The usage of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
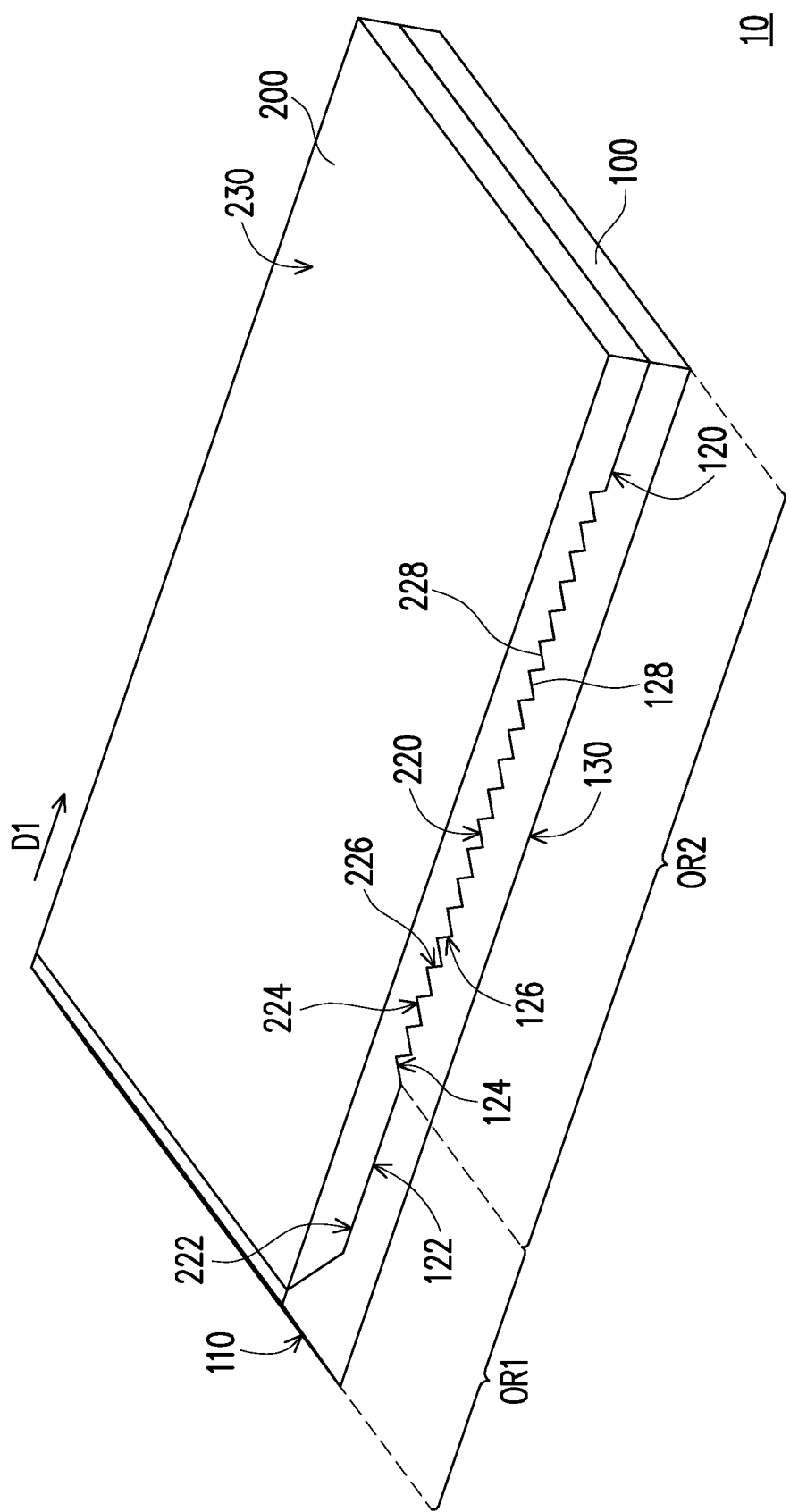
FIG. 1A is a three-dimensional schematic view of an optical waveguide according to an embodiment of the disclosure.
Figure 1B:
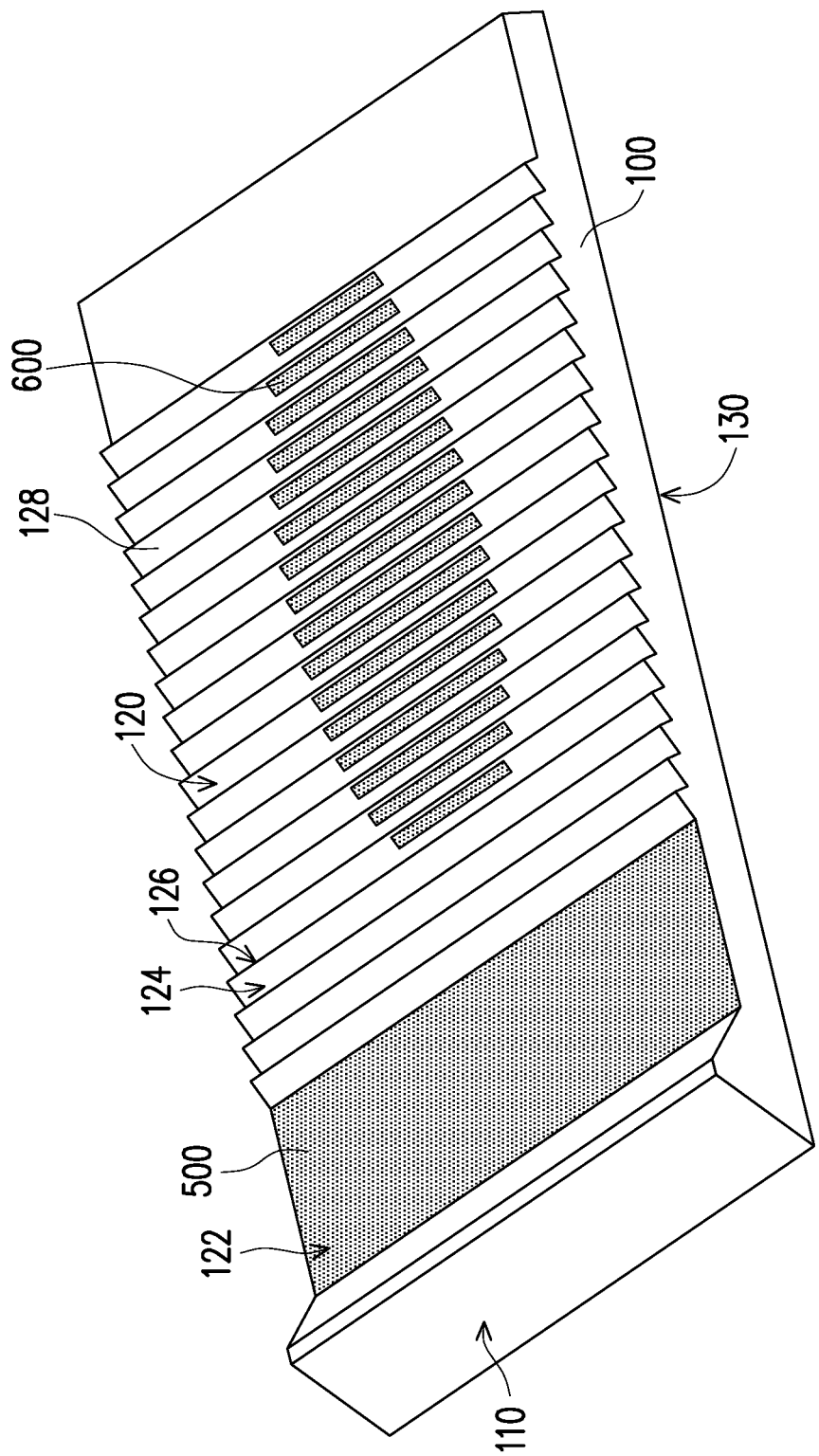
FIG. 1B is a three-dimensional schematic view of a first structural layer of the optical waveguide in FIG. 1A.
Figure 2:
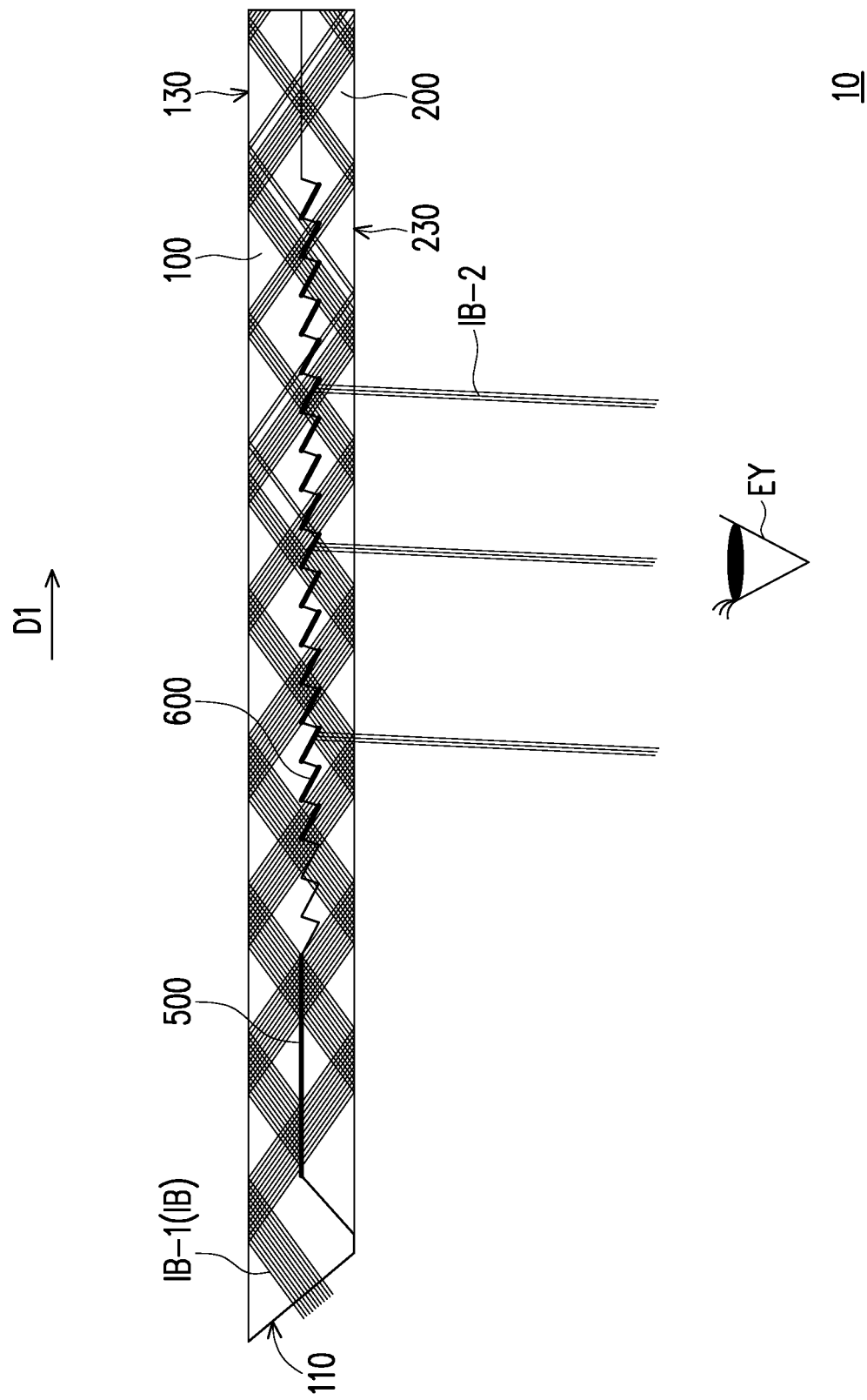
FIG. 2 is a schematic cross-sectional view of an image beam being transmitted in the optical waveguide in FIG. 1A.

FIG. 1A is a three-dimensional schematic view of an optical waveguide according to an embodiment of the disclosure. FIG. 1B is a three-dimensional schematic view of a first structural layer of the optical waveguide in FIG. 1A. FIG. 2 is a schematic cross-sectional view of an image beam being transmitted in the optical waveguide in FIG. 1A. With reference to FIGS. 1A, 1B and 2 concurrently, an embodiment of the disclosure provides an optical waveguide 10 having a first optical region OR1 and a second optical region OR2 that are adjacent, and is configured to transmit an image beam. The optical waveguide 10 includes a first structural layer 100, a second structural layer 200, a first light-guiding element 500, and multiple second light-guiding elements 600.

In the embodiment, the first structural layer 100 includes a coupling inclined surface 110, a first surface 120, and a second surface 130. The first surface 120 is opposite to the second surface 130, and the coupling inclined surface 110 connects the first surface 120 to the second surface 130. The second structural layer 200 includes a third surface 220 and a fourth surface 230. The third surface 220 is opposite to the fourth surface 230, and the third surface 220 of the second structural layer 200 is attached to the first surface 120 of the first structural layer 100. The first light-guiding element 500 is disposed on the first surface 120 or the third surface 220 at a position corresponding to the first optical region OR1. The multiple second light-guiding elements 600 are disposed on the first surface 120 or the third surface 220 at positions corresponding to the second optical region OR2.

In the embodiment, the first surface 120 of the first structural layer 100 has a first flat surface 122 in the first optical region OR1. Moreover, the second surface 130 is a flat surface. The connection between the coupling inclined surface 110 and the second surface 130 is aligned with the second surface 130, but the connection between the coupling inclined surface 110 and the first surface 120 protrudes from the first flat surface 122. In addition, the first surface 120 has multiple first inclined surfaces 124 and multiple second inclined surfaces 126 alternately arranged in the second optical region OR2. The multiple first inclined surfaces 124 and the multiple second inclined surfaces 126 form multiple first optical microstructures 128.

In the embodiment, relative to the first flat surface 122, a slope of the first inclined surfaces 124 is less than or equal to a slope of the second inclined surfaces 126.

In the embodiment, the third surface 220 of the second structural layer 200 has a second flat surface 222 in the first optical region OR1. The third surface 220 has multiple third inclined surfaces 224 and multiple fourth inclined surfaces 226 alternately arranged in the second optical region OR2. The multiple third inclined surfaces 224 and the multiple fourth inclined surfaces 226 form multiple second optical microstructures 228.

In the embodiment, relative to the second flat surface 222, a slope of the third inclined surfaces 224 is less than or equal to a slope of the fourth inclined surface 226.

In the embodiment, the first flat surface 122 and the second flat surface 222 are complementary, the first inclined surface 124 and the third inclined surface 224 are complementary, and the second inclined surface 126 and the fourth inclined surface 226 are complementary, so that the second structural layer 100 is attached to the first structural layer 200. That is, the first optical microstructure 128 and the second optical microstructure 228 are complementary.

In the embodiment, the first light-guiding element 500 is disposed on the first flat surface 122 or the second flat surface 222. FIG. 1B illustrates the first light-guiding element 500 being disposed on the first flat surface 122, and the first light-guiding element 500 may be rectangular.

In the embodiment, the second light-guiding elements 600 are disposed on the first inclined surfaces 124 or the third inclined surfaces 224. FIG. 1B illustrates the second light-guiding elements 600 being disposed on the first inclined surfaces 124. The multiple second light-guiding elements 600 are multiple long strips, and a length of each of the second light-guiding elements 600 is different from a length of an adjacent second light-guiding element 600.

In the embodiment, a range of the first light-guiding element 500 is less than or equal to an area of the first flat surface 122 or the second flat surface 222. FIG. 1B shows that a disposition range of the first light-guiding element 500 is approximately equal to the area of the first flat surface 122. However, in another embodiment, the range of the first light-guiding element 500 may be smaller than the area of the first flat surface 122 or the second flat surface 222, and the range of the first light-guiding element 500 is preferably designed according to a range of a beam (such as a first sub-beam IB-1 in FIG. 2) that is transmitted by the first flat surface 122 or the second flat surface 222.

In the embodiment, a range of an orthographic projection of a range of the multiple second light-guiding elements 600 on the second surface 130 is less than or equal to an area of an orthographic projection of the multiple first inclined surfaces 124 or the multiple third inclined surfaces 224 on the second surface 130. FIG. 1B illustrates the range of the orthographic projection of the multiple second light-guiding elements 600 on the second surface 130 to be smaller than the area of the orthographic projection of the multiple first inclined surfaces 124 or the multiple third inclined surfaces 224 on the second surface 130. In a preferred embodiment, the range of the multiple second light-guiding elements 600 is designed according to a range of a beam (such as the first sub-beam IB-1 in FIG. 2) that is transmitted by the multiple first inclined surfaces 124 or the multiple third inclined surfaces 224 or a range that enables the beam to couple out of the optical waveguide 10.

With reference to FIG. 2, in the embodiment, the first light-guiding element 500 and the multiple second light-guiding elements 600 is partially penetrating and partially reflective layer. Multiple first sub-beams IB-1 in an image beam IB are transmitted in the first structural layer 100 or the second structural layer 200 by the coupling inclined surface 110. In detail, each of the first sub-beams IB-1 enters the optical waveguide 10 from the coupling inclined surface 110 of the first structural layer 100. The first sub-beam IB-1 is reflected by the second surface 130 of the first structural layer 100 and then transmitted to the first light-guiding element 500 after it penetrates the coupling inclined surface 110. Then, each of the first sub-beams IB-1 form multiple second sub-beams IB-2 after being transmitted by the first light-guiding element 500 or the multiple second light-guiding elements 600. Some of the multiple second sub-beams IB-2 are coupled out of the optical waveguide 10 by the multiple second light-guiding elements 600, so that the image beam IB expands in a first direction D1. FIG. 2 illustrates the second sub-beams IB-2 being coupled out of the optical waveguide 10 from the fourth surface 230, and then being received by an eye EY of a user.

Figure 3:
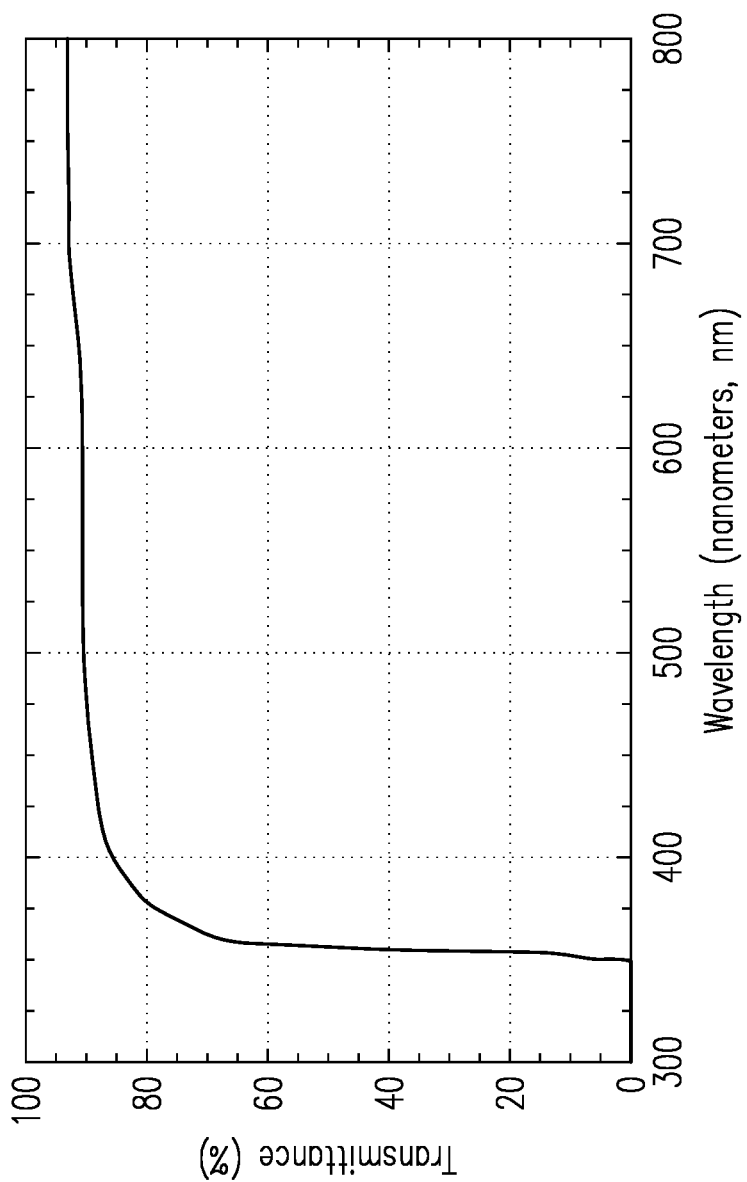
FIG. 3 shows a graph of transmittance of a structural layer as a function of wavelength.
Figure 4:
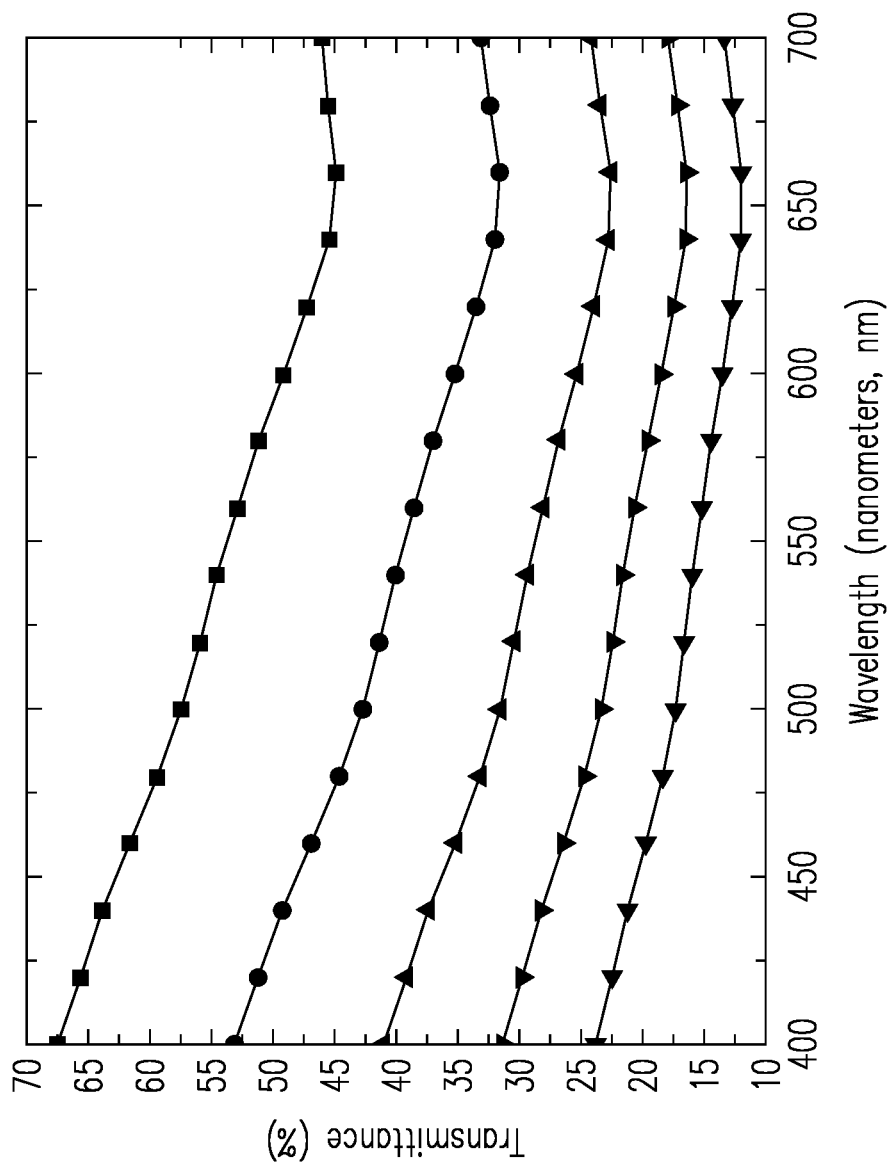
FIG. 4 shows a graph of transmittance of a light-guiding element as a function of wavelength.

FIG. 3 shows a graph of transmittance of a structural layer as a function of wavelength. FIG. 4 shows a graph of transmittance of a light-guiding element as a function of wavelength. In the embodiment, a material of the first structural layer 100 or the second structural layer 200 may be a polymer material, such as optical plastic. The first light-guiding element 500 or the second light-guiding element 600 is preferably a partially penetrating and partially reflective layer formed by a metal thin film, such as an aluminum film. In FIG. 3, the horizontal axis is wavelength (nanometers, nm), and the vertical axis is transmittance (%) of an optical plastic that may be used as the material of the first structural layer 100 or the second structural layer 200 at a thickness of 3 mm. In FIG. 4, the horizontal axis is wavelength (nm), and the vertical axis is transmittance (%) of a partially penetrating and partially reflective layer formed by an aluminum film at different thicknesses. The graphs from top to bottom respectively correspond to thicknesses of 5 nm, 7 nm, 9 nm, 11 nm, and 13 nm. With reference to FIGS. 3 and 4 concurrently, for a portion of a visible light waveband, a trend of the transmittance of the partially penetrating and partially reflective layer changing as a wavelength increases is opposite to a trend of transmittance of the first structural layer 100 or the second structural layer 200 (such as one that is formed by the above-mentioned optical plastic) changing as the wavelength increases.

In an embodiment, as shown in FIGS. 3 and 4, in a range of 400 nm to 650 nm, the transmittance of the partially penetrating and partially reflective layer decreases as the wavelength increases, while the transmittance of the first structural layer 100 or the second structural layer 200 (such as one that is formed by the above-mentioned optical plastic) increases as the wavelength increases.

However, in another embodiment, for a portion of the visible light waveband, the transmittance of the partially penetrating and partially reflective layer increases as the wavelength increases, and the transmittance of the first structural layer 100 or the second structural layer 200 decreases as the wavelength increases.

In an embodiment, the partially penetrating and partially reflective layer is a metal layer, and a thickness of the partially penetrating and partially reflective layer falls within a range of 5 nm to 13 nm. The thickness of the partially penetrating and partially reflective layer is preferably designed targeting the transmittance of the first structural layer 100 or the second structural layer 200 as it changes with the wavelength, as shown in FIG. 4.

Based on the above, in an embodiment of the disclosure, since the optical waveguide 10 includes the first structural layer 100, the second structural layer 200, the first light-guiding element 500, and the second light-guiding elements 600, the image beam IB is coupled out of the optical waveguide 10 after being expanded in the direction D1, and then is received by the eye EY of the user. Therefore, the uniformity of the image beam IB that is being coupled out the optical waveguide 10 is improved and missing image blocks or dark areas are reduced, thereby providing the user with a better experience.

In addition, since the first light-guiding element 500 or the second light-guiding elements 600 may be a partially penetrating and partially reflective layer, and for a portion of the visible light waveband, the trend of the transmittance of the partially penetrating and partially reflective layer changing as the wavelength increases is opposite to the trend of the transmittance of the first structural layer 100 or the second structural layer 200 changing as the wavelength increases, in a transmission process of the image beam IB in the optical waveguide 10, light absorptivity of each wavelength is designed to be roughly the same. This enables color deviation of the image beam IB after being coupled out of the optical waveguide 10 to be reduced, and the color uniformity to be increased, thereby providing the user with a better experience. In addition, the optical waveguide 10 of the embodiment may be applied to, for example, a near-eye display (NED). The near-eye display is configured in front of at least one eye EY of the user so as to transmit the image beam IB (which forms the second sub-beam IB-2 in the embodiment) to the at least one eye EY of the user. Since the color deviation of the image beam IB after being coupled out of the optical waveguide 10 of the embodiment is reduced and the color uniformity is increased, an image screen transmitted by the near-eye display using the optical waveguide 10 of the embodiment to the human eye may have good color uniformity and good image quality.

Figure 5:
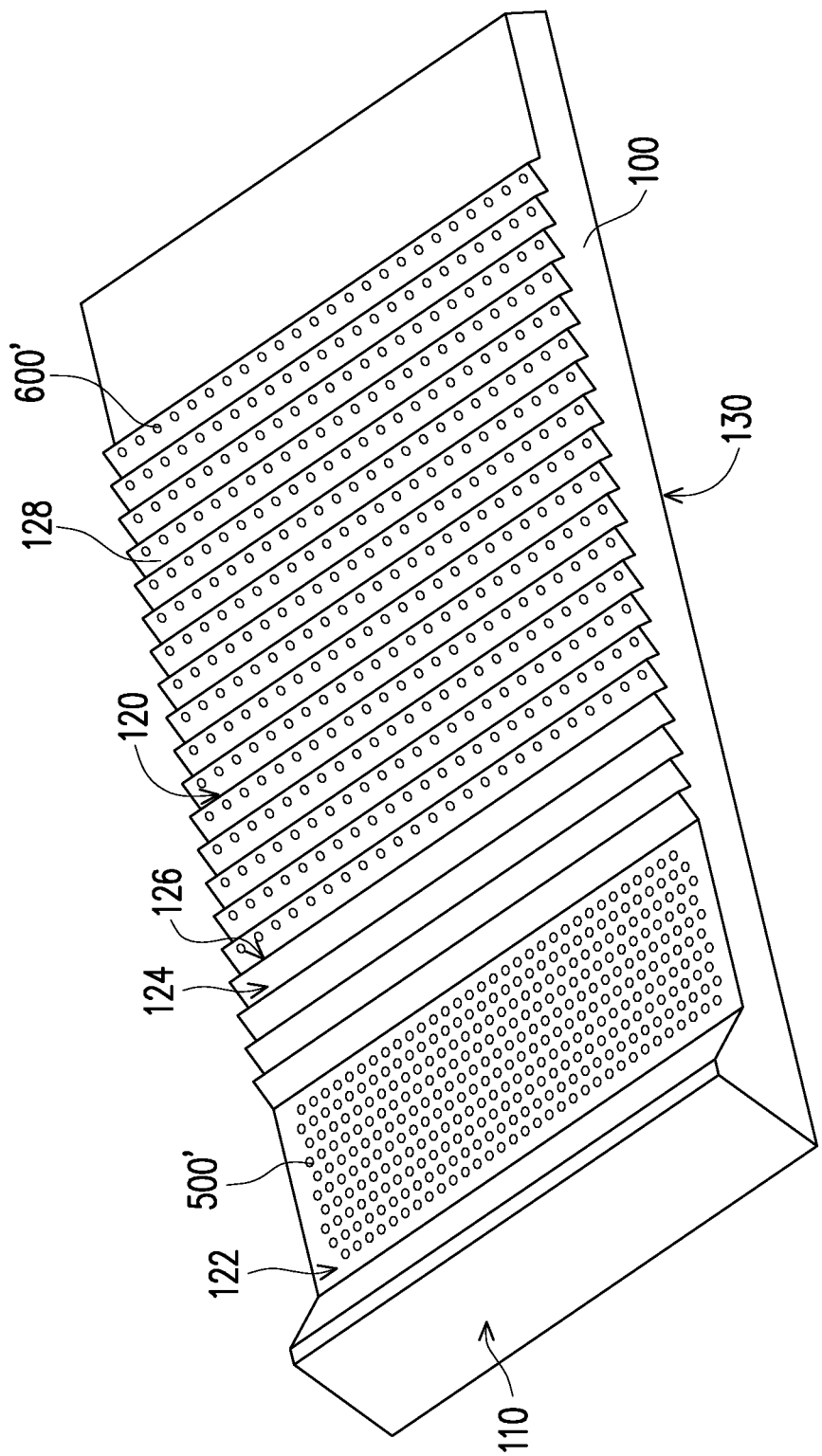
FIG. 5 is a three-dimensional schematic view of a first structural layer of an optical waveguide according to another embodiment of the disclosure.

FIG. 5 is a three-dimensional schematic view of a first structural layer of an optical waveguide according to another embodiment of the disclosure. With reference to FIG. 5, the optical waveguide in FIG. 5 is similar to the optical waveguide 10 in FIG. 1B, except for a main difference as follows. In the embodiment, a first light-guiding element 500' is a circular array, and multiple second light-guiding elements 600' are a circular array. Advantages of the optical waveguide in FIG. 5 are similar to those of the optical waveguide 10 in FIG. 1B, which are not repeated here.

Figure 6:
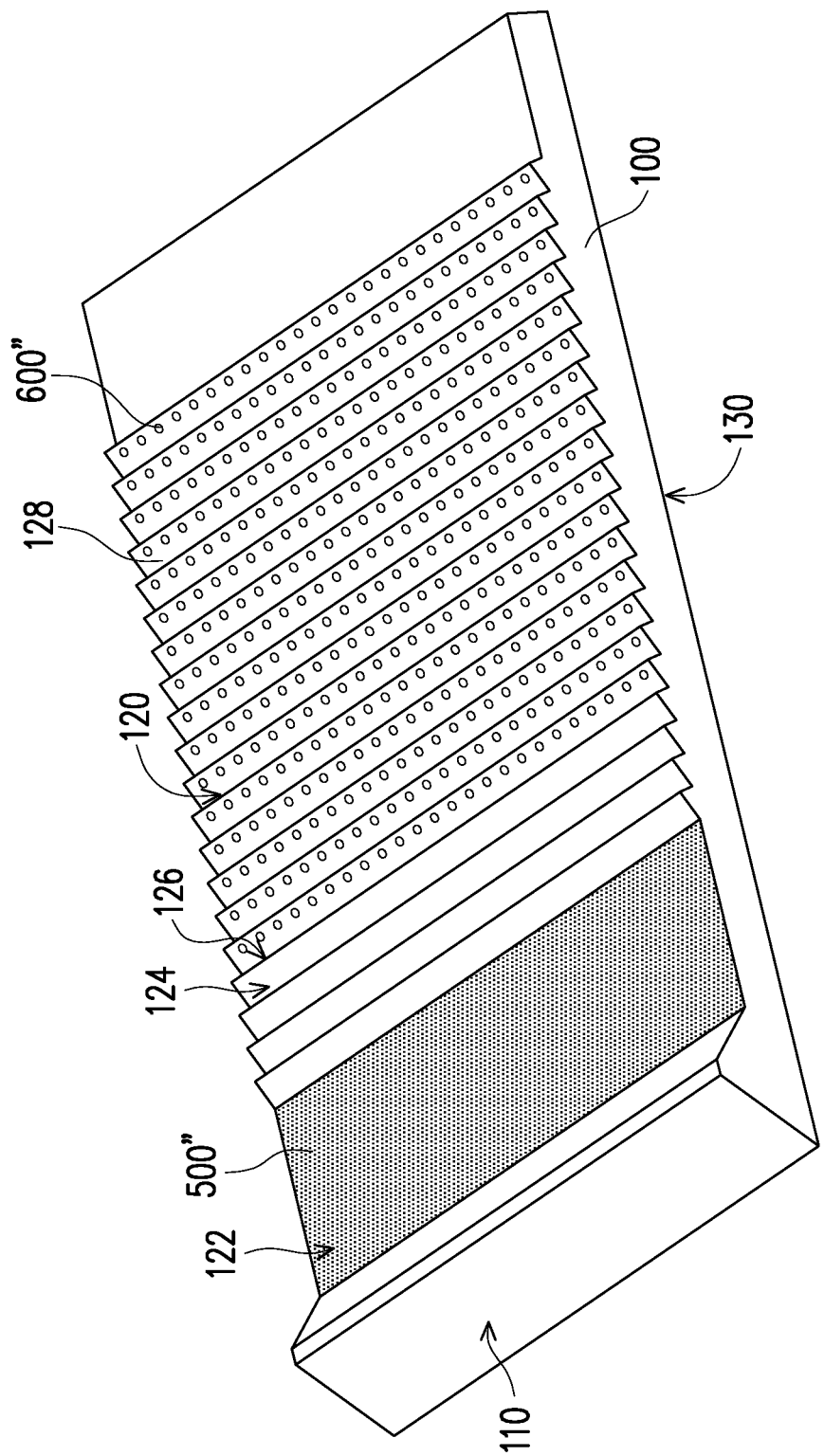
FIG. 6 is a three-dimensional schematic view of a first structural layer of an optical waveguide according to another embodiment of the disclosure.

FIG. 6 is a three-dimensional schematic view of a first structural layer of an optical waveguide according to another embodiment of the disclosure. With reference to FIG. 6, the optical waveguide in FIG. 6 is similar to the optical waveguide 10 in FIG. 1B, except for a main difference as follows. In the embodiment, a first light-guiding element 500'' is rectangular, and multiple second light-guiding element 600'' are a circular array. Advantages of the optical waveguide in FIG. 6 are similar to those of the optical waveguide 10 in FIG. 1B, which are not repeated here.

Figure 7:
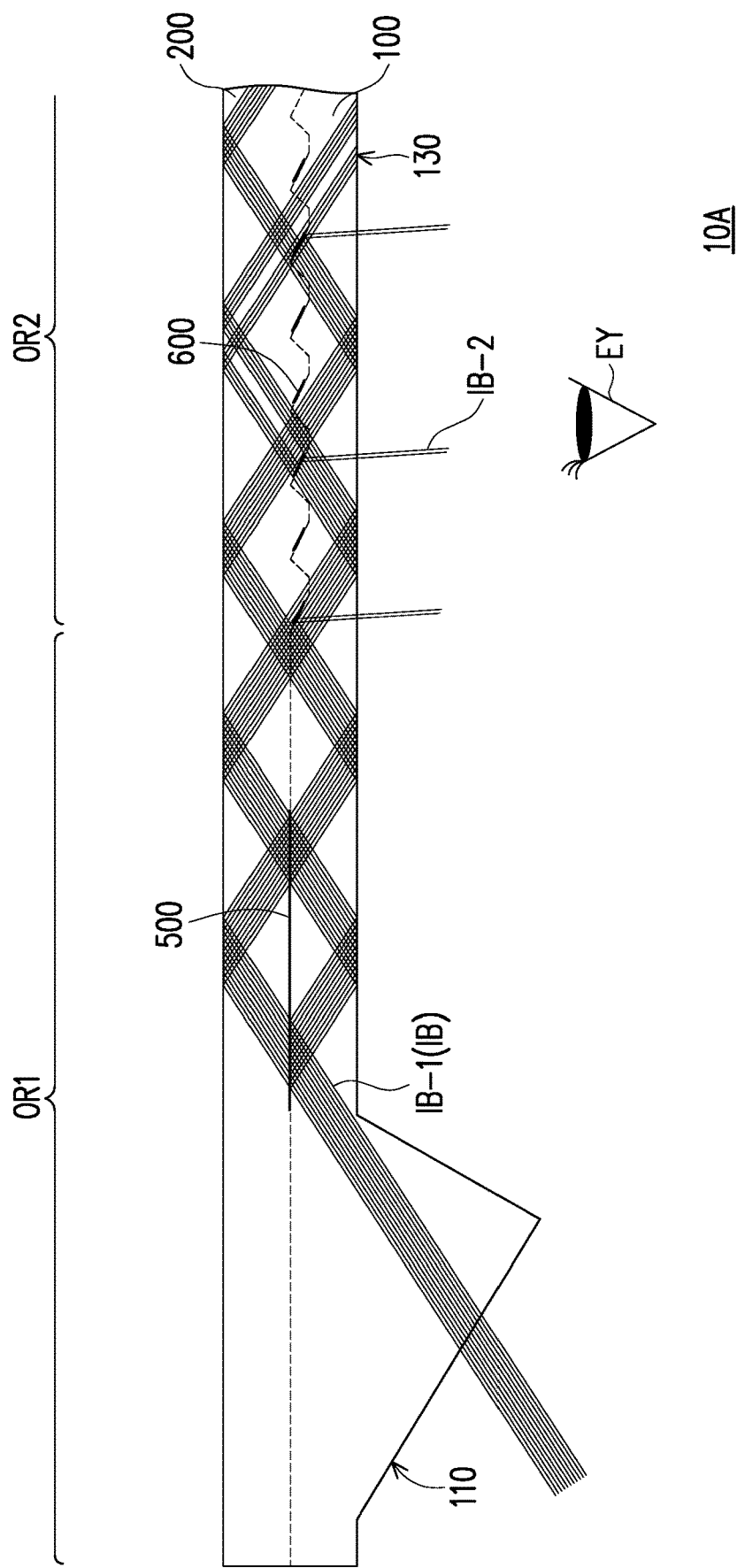
FIG. 7 is a schematic cross-sectional view of the image beam being transmitted in an optical waveguide according to another embodiment of the disclosure.

FIG. 7 is a schematic cross-sectional view of the image beam being transmitted in an optical waveguide according to another embodiment of the disclosure. With reference to FIG. 7, an optical waveguide 10A in FIG. 7 is similar to the optical waveguide 10 in FIG. 2, except for main differences as follows. In the embodiment, the second sub-beams IB-2 are coupled out of the optical waveguide 10A from the second surface 130 of the first structural layer 100, and then received by the eye EY of the user. Moreover, the first sub-beams IB-1 are reflected by the fourth surface 230 of the second structural layer 200 and then transmitted to the first light-guiding element 500 or directly transmitted to the first light-guiding element 500 after they penetrate the coupling inclined surface 110. Whether the first sub-beams IB-1 are reflected and then transmitted to the first light-guiding element 500 or directly transmitted to the first light-guiding element 500 is dependent on the disposition range of the first light-guiding element 500. Advantages of the optical waveguide 10A in FIG. 7 are similar to those of the optical waveguide 10 in FIG. 2, which are not repeated here.

Figure 8:
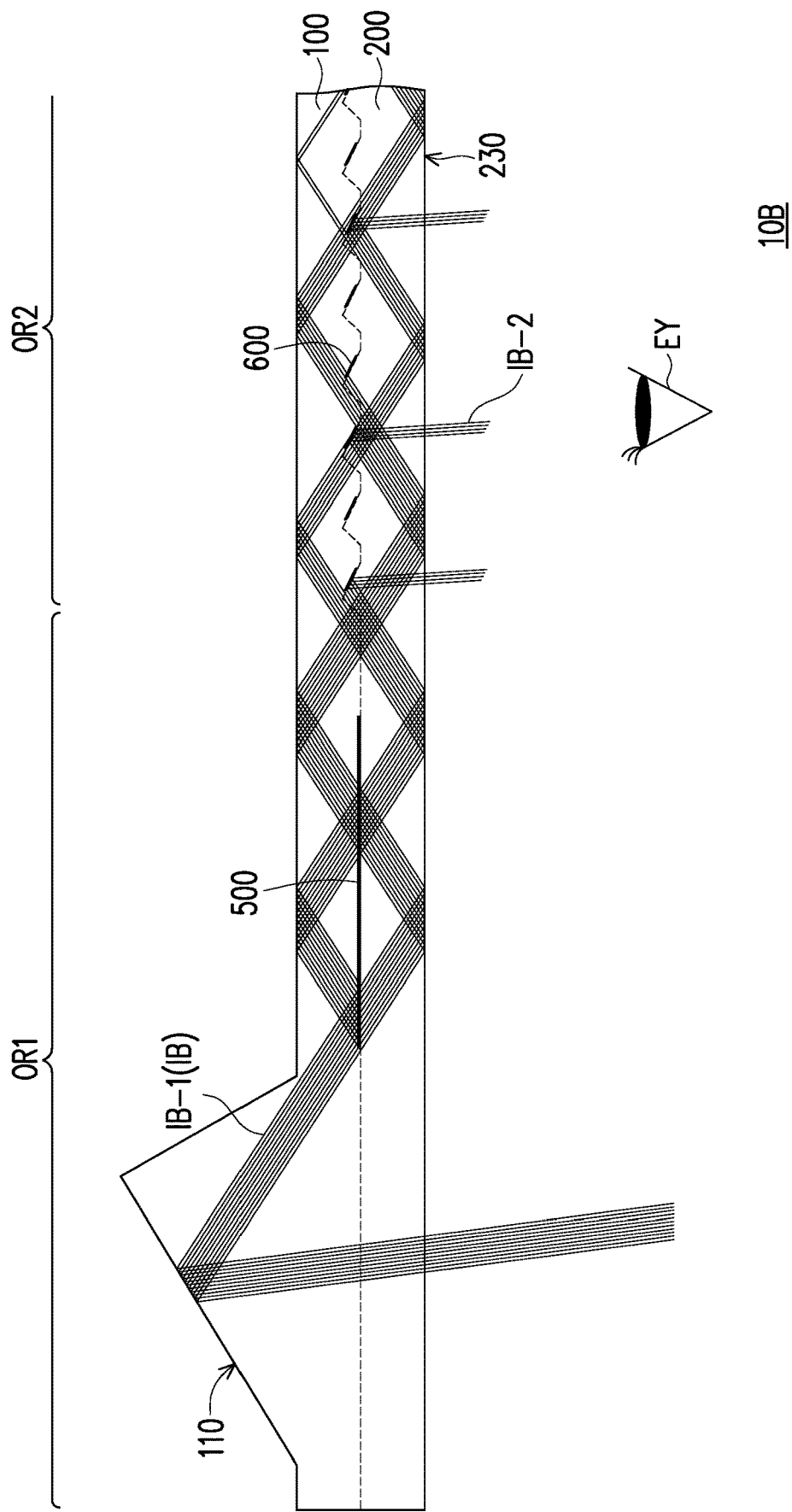
FIG. 8 is a schematic cross-sectional view of the image beam being transmitted in an optical waveguide according to another embodiment of the disclosure.

FIG. 8 is a schematic cross-sectional view of the image beam being transmitted in an optical waveguide according to another embodiment of the disclosure. With reference to FIG. 8, an optical waveguide 10B in FIG. 8 is similar to the optical waveguide 10 in FIG. 2, except for main differences as follows. In the embodiment, each of the first sub-beams IB-1 enters the optical waveguide 10B from the fourth surface 230 of the second structural layer 200. Then, the first sub-beams IB-1 are transmitted to the coupling inclined surface 110, and then reflected by the coupling inclined surface 110 to the first light-guiding element 500. Advantages of the optical waveguide 10B in FIG. 8 are similar to those of the optical waveguide 10 in FIG. 2, which are not repeated here.

Figure 9:
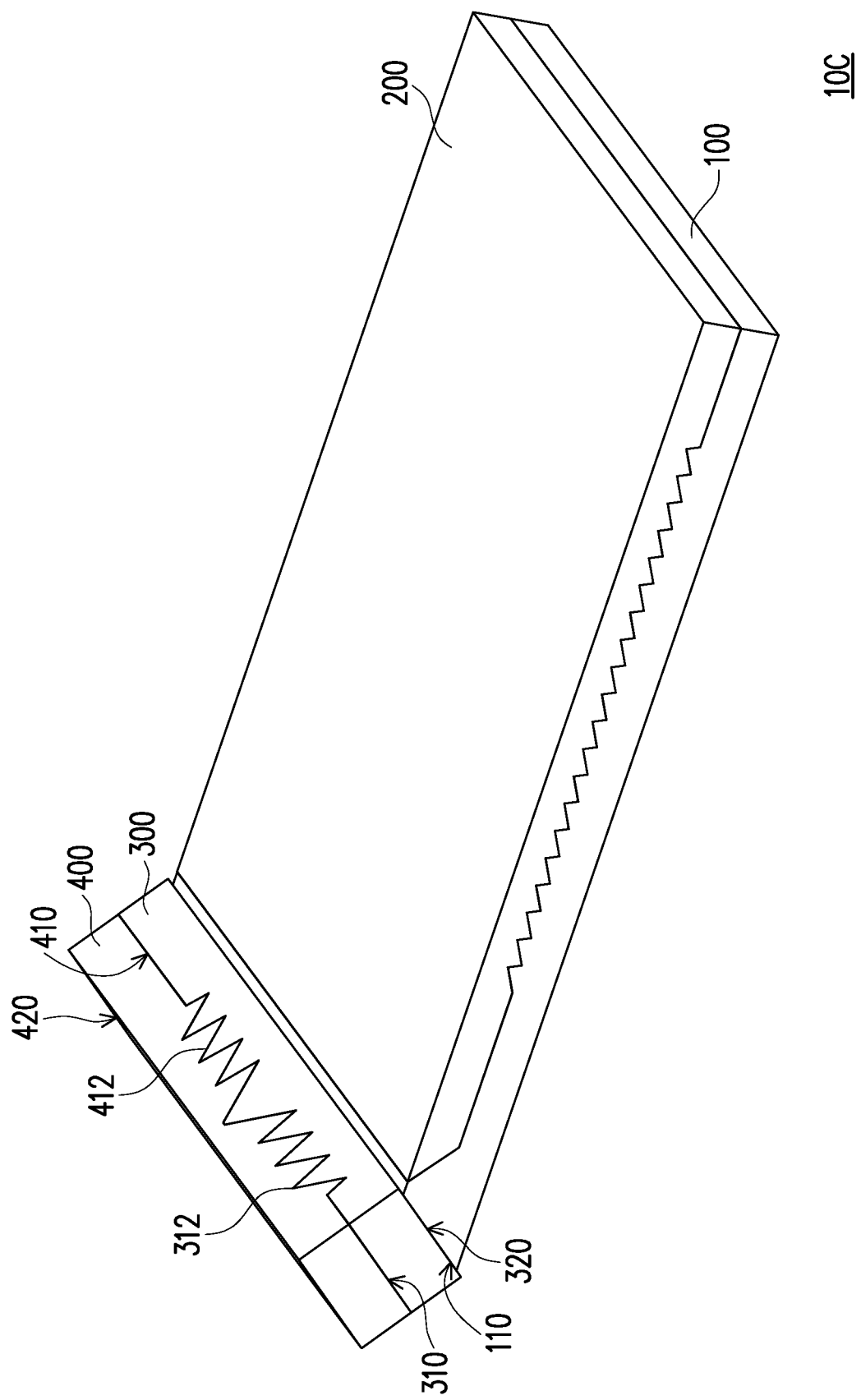
FIG. 9 is a three-dimensional schematic view of an optical waveguide according to another embodiment of the disclosure.

FIG. 9 is a three-dimensional schematic view of an optical waveguide according to another embodiment of the disclosure. With reference to FIG. 9, an optical waveguide 10C in FIG. 9 is similar to the optical waveguide 10 in FIG. 1A, except for main differences as follows. In the embodiment, the optical waveguide 10C further includes a third structural layer 300 and a fourth structural layer 400. The third structural layer 300 includes a fifth surface 310 and a sixth surface 320. The fifth surface 310 is opposite to the sixth surface 320, and the fifth surface 310 has multiple first V-shaped inclined surfaces 312. The fourth structural layer 400 includes a seventh surface 410 and an eighth surface 420. The seventh surface 410 is opposite to the eighth surface 420, and the seventh surface 410 has multiple second V-shaped inclined surfaces 412 that are complementary to the multiple first V-shaped inclined surfaces 312, so that the fifth surface 310 of the third structural layer 300 is attached to the seventh surface 410 of the fourth structural layer 400.

Figure 10:
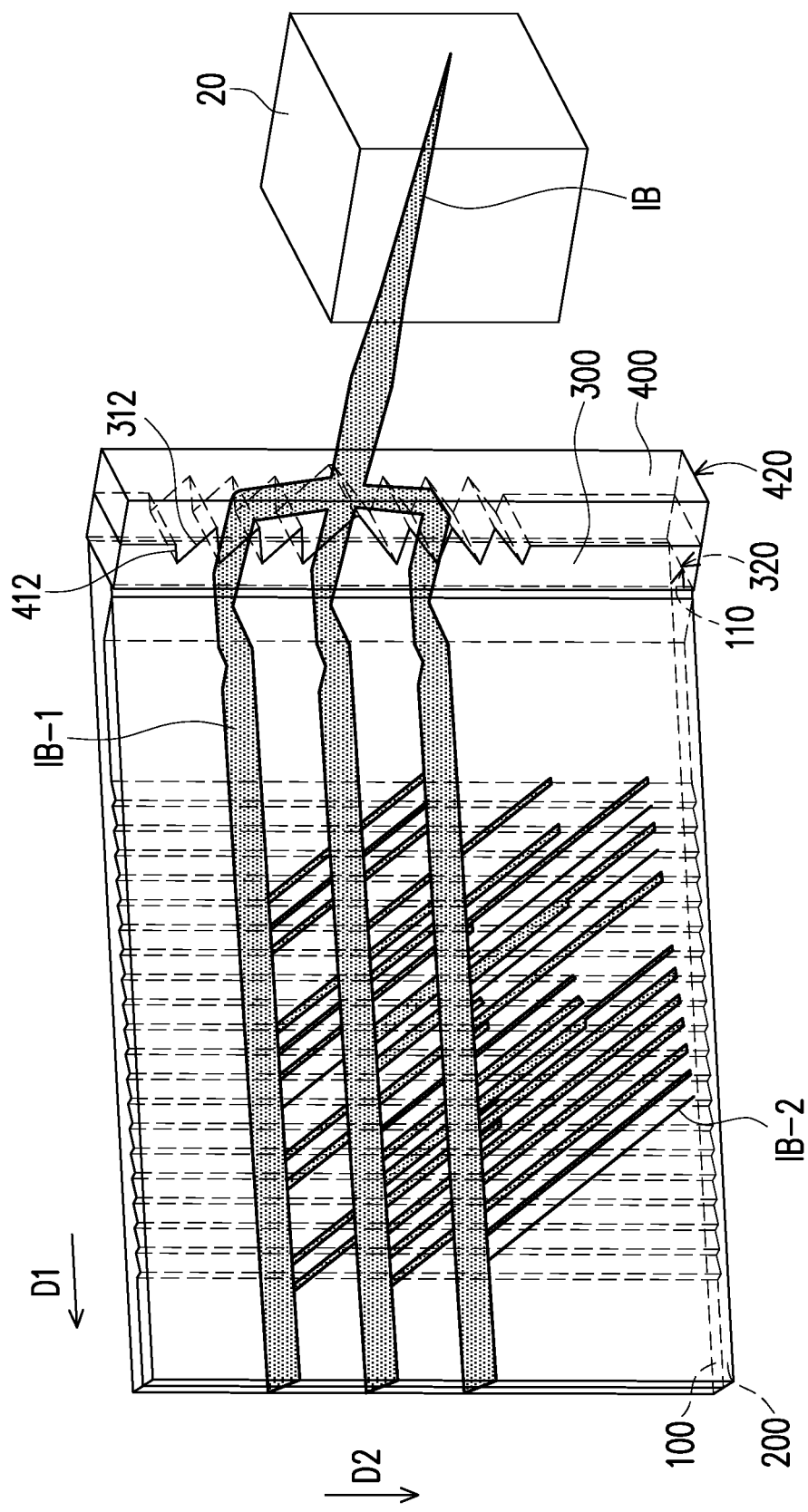
FIG. 10 is a perspective schematic view of the image beam emitted by a projection module being transmitted in the optical waveguide in FIG. 9.
Figure 11:
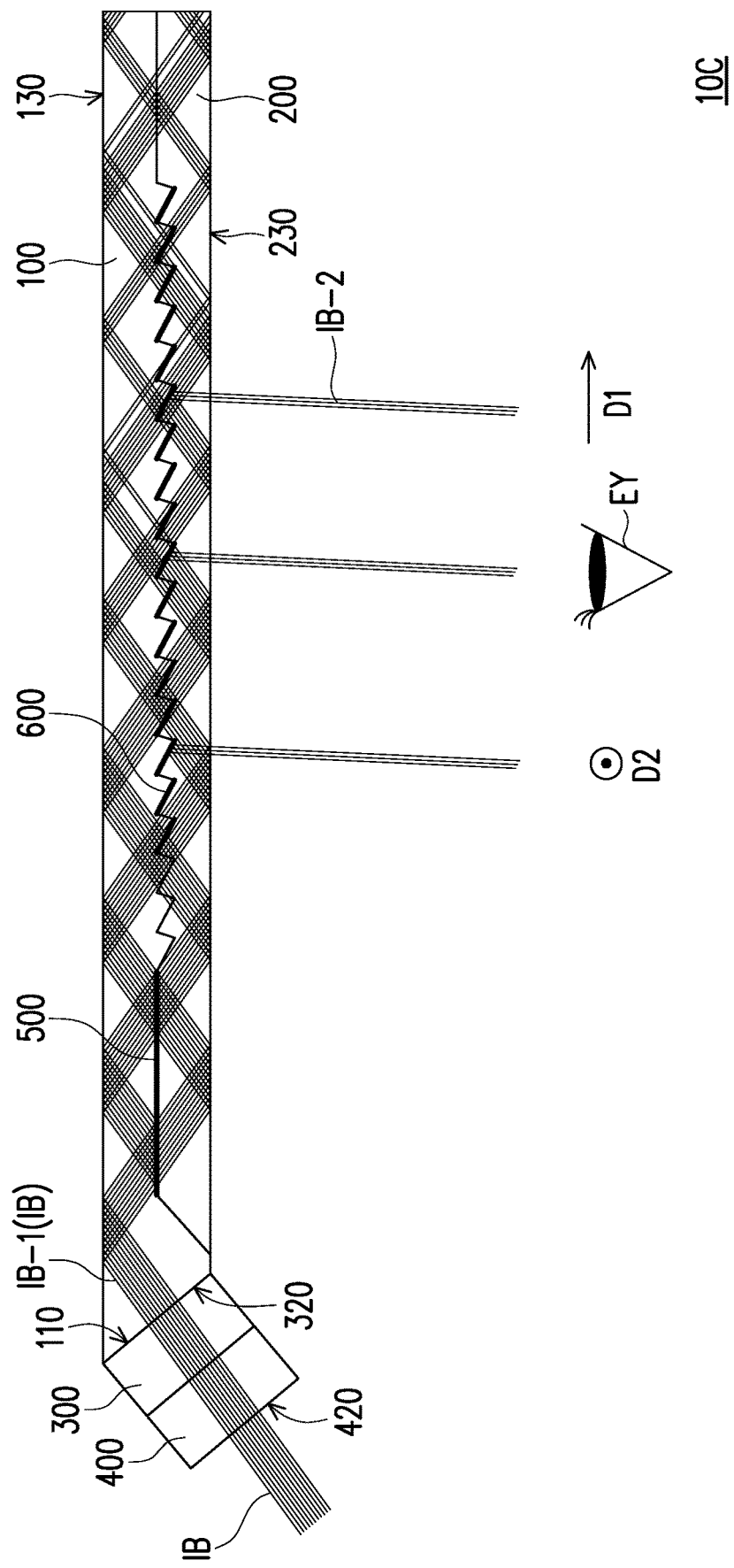
FIG. 11 is a schematic cross-sectional view of the image beam being transmitted in the optical waveguide in FIG. 9.

FIG. 10 is a perspective schematic view of the image beam emitted by a projection module being transmitted in the optical waveguide in FIG. 9. FIG. 11 is a schematic cross-sectional view of the image beam being transmitted in the optical waveguide in FIG. 9. With reference to FIGS. 10 and 11 concurrently, in the embodiment, the first V-shaped inclined surface 312 or the second V-shaped inclined surface 412 may be a light-splitting surface. The image beam IB emitted by a projection module 20 enters the optical waveguide 10C from the eighth surface 420, and forms the multiple first sub-beams IB-1 by the multiple first V-shaped inclined surfaces 312 or the multiple second V-shaped inclined surfaces 412, thereby enabling the image beam IB to expand in a second direction D2.

In the embodiment, the sixth surface 320 of the third structural layer 300 is attached to the coupling inclined surface 110 of the first structural layer 100, so that the multiple first sub-beam IB-1 enter the first structural layer 100 from the coupling inclined surface 110. An optical path of the first sub-beam IB-1 when transmitting in the first structural layer 100 or the second structural layer 200 is similar to that of FIG. 2, and is not repeated here.

Based on the above, since the optical waveguide 10C according to an embodiment of the disclosure is provided with the first structural layer 100, the second structural layer 200, the third structural layer 300, and the fourth structural layer 400, and the image beam IB is enabled to expand in two dimensions such as the first direction D1 and the second direction D2, the image beam IB after being coupled out of the optical waveguide 10C has an improved distribution uniformity in the two dimensions, thereby providing the user with a better experience.

Figure 12:
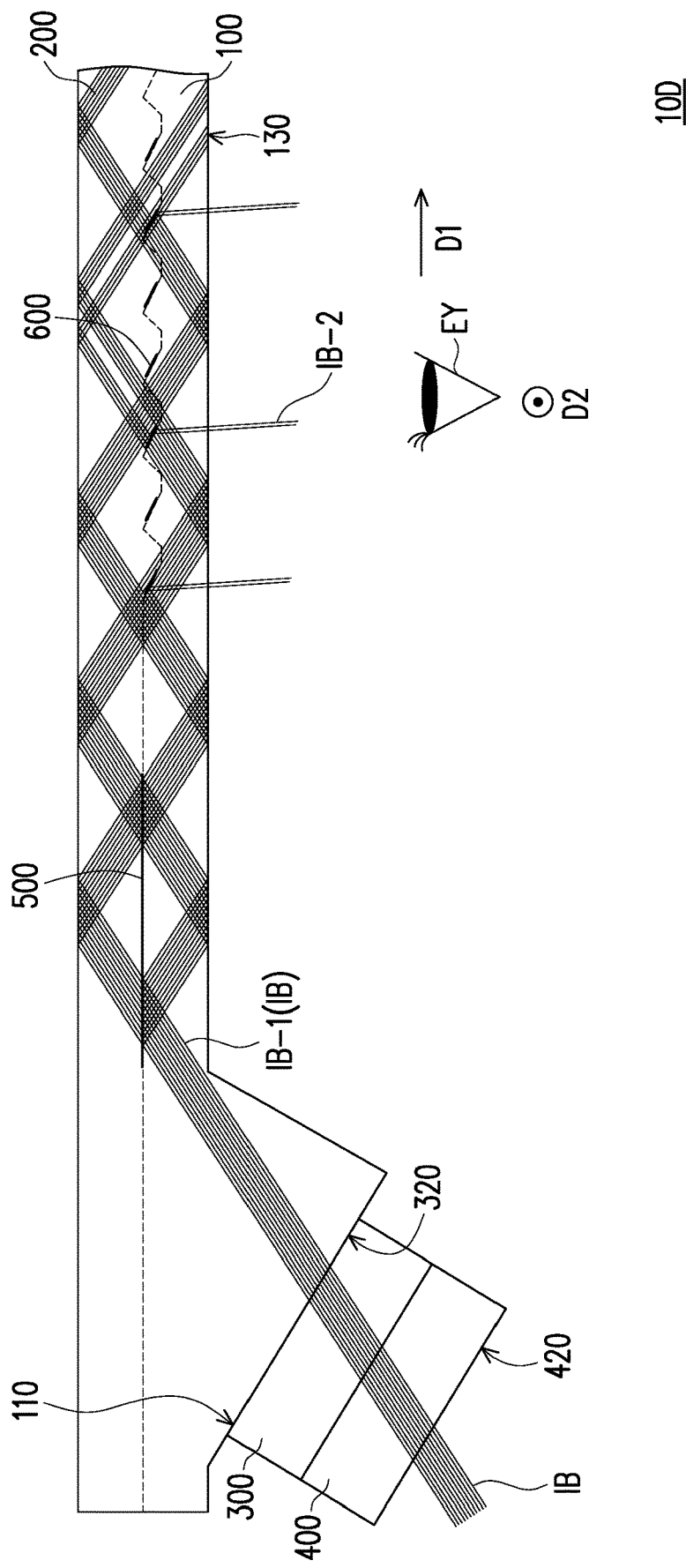
FIG. 12 is a schematic cross-sectional view of the image beam being transmitted in an optical waveguide according to another embodiment of the disclosure.

FIG. 12 is a schematic cross-sectional view of the image beam being transmitted in an optical waveguide according to another embodiment of the disclosure. With reference to FIG. 12, an optical waveguide 10D in FIG. 12 is similar to the optical waveguide 10C in FIG. 11, except for a main difference as follows. In the embodiment, the second sub-beams IB-2 are coupled out of the optical waveguide 10 from the second surface 130 of the first structural layer 100, and then received by the eye EY of the user. In addition, an optical path of the first sub-beams IB-1 after penetrating the coupling inclined surface 110 is similar to the above-mentioned optical waveguide 10A in FIG. 7, and is not repeated here. Advantages of the optical waveguide 10D in FIG. 12 are similar to those of the optical waveguide 10C in FIG. 11, which are not repeated here.

Figure 13:
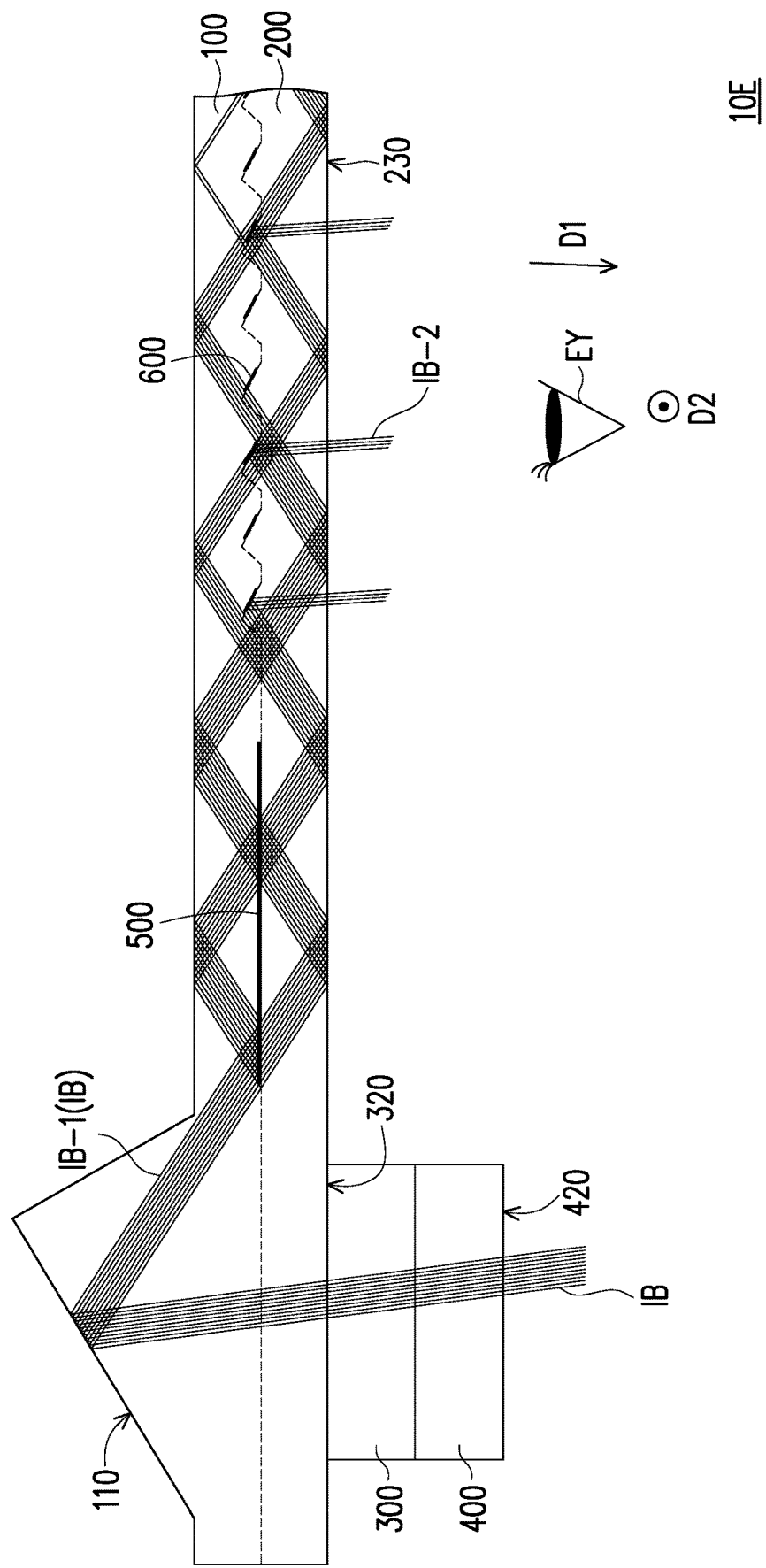
FIG. 13 is a schematic cross-sectional view of the image beam being transmitted in an optical waveguide according to another embodiment of the disclosure.

FIG. 13 is a schematic cross-sectional view of the image beam being transmitted in an optical waveguide according to another embodiment of the disclosure. With reference to FIG. 13, an optical waveguide 10E in FIG. 13 is similar to the optical waveguide 10C in FIG. 11, except for a main difference as follows. In the embodiment, the sixth surface 320 of the third structural layer 300 is attached to the fourth surface 230 of the second structural layer 200, so that the multiple first sub-beams IB-1 enter the second structural layer 200 from the fourth surface 230. In addition, an optical path of the first sub-beams IB-1 after entering the second structural layer 200 is similar to the above-mentioned optical waveguide 10B in FIG. 8, and is not repeated here. Advantages of the optical waveguide 10E in FIG. 13 are similar to those of the optical waveguide 10C in FIG. 11, which are not repeated here.

In summary, in an embodiment of the disclosure, since the first light-guiding element or the second light-guiding elements of the optical waveguide may be the partially penetrating and partially reflective layer, and for a portion of the visible light waveband, the trend of the transmittance of the partially penetrating and partially reflective layer changing as the wavelength increases is opposite to the trend of the transmittance of the first structural layer or the second structural layer changing as the wavelength increases, in the transmission process of the image beam in the optical waveguide, the absorptivity of light of each wavelength is designed to be roughly the same, so that the color deviation of the image beam after being coupled out of the optical waveguide is reduced, and the color uniformity is increased, thereby providing the user with a better experience.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby enabling persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the terms "the invention", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. An optical waveguide, having a first optical region and a second optical region that are adjacent, and is configured to transmit an image beam, the optical waveguide comprising:
   a first structural layer;
   a second structural layer;
   a first light-guiding element; and
   a plurality of second light-guiding elements, wherein
   the first structural layer comprises a coupling inclined surface, a first surface, and a second surface, wherein the first surface is opposite to the second surface, and the coupling inclined surface connects the first surface to the second surface,
   the second structural layer comprises a third surface and a fourth surface, wherein the third surface is opposite to the fourth surface, and the third surface of the second structural layer is attached to the first surface of the first structural layer,
   the first light-guiding element is disposed on the first surface or the third surface at a position corresponding to the first optical region, and
   the plurality of second light-guiding elements are disposed on the first surface or the third surface at positions corresponding to the second optical region,
   wherein each of the first light-guiding element and the plurality of second light-guiding elements is a partially penetrating and partially reflective layer,
   wherein a plurality of first sub-beams in the image beam are transmitted in the first structural layer or the second structural layer by the coupling inclined surface, and each of the plurality of first sub-beams forms a plurality of second sub-beams after being transmitted by the first light-guiding element or the plurality of second light-guiding elements, and some of the plurality of second sub-beams are coupled out of the optical waveguide by the plurality of second light-guiding elements, so that the image beam expands in a first direction, and
   for a portion of visible light waveband, a trend of transmittance of the partially penetrating and partially reflective layer changing as a wavelength increases is opposite to a trend of transmittance of the first structural layer or the second structural layer changing as the wavelength increases.

2. The optical waveguide according to claim 1, wherein in a range of 400 nm to 650 nm, the transmittance of the partially penetrating and partially reflective layer decreases as the wavelength increases, and the transmittance of the first structural layer or the second structural layer increases as the wavelength increases.

3. The optical waveguide according to claim 1, wherein the partially penetrating and partially reflective layer is a metal layer.

4. The optical waveguide according to claim 1, wherein each of the plurality of first sub-beams enters the optical waveguide from the coupling inclined surface of the first structural layer.

5. The optical waveguide according to claim 1, wherein each of the plurality of first sub-beams enters the optical waveguide from the fourth surface of the second structural layer.

6. The optical waveguide according to claim 1, wherein the first surface of the first structural layer has a first flat surface in the first optical region, and the first surface has a plurality of first inclined surfaces and a plurality of second inclined surfaces arranged alternately in the second optical region, and the plurality of first inclined surfaces and the plurality of second inclined surfaces form a plurality of first optical microstructures.

7. The optical waveguide according to claim 6, wherein relative to the first flat surface, a slope of the plurality of first inclined surfaces are less than or equal to a slope of the plurality of second inclined surfaces.

8. The optical waveguide according to claim 6, wherein the third surface of the second structural layer has a second flat surface in the first optical region, and the third surface has a plurality of third inclined surfaces and a plurality of fourth inclined surfaces arranged alternately in the second optical region, and the plurality of third inclined surfaces and the plurality of fourth inclined surfaces form a plurality of second optical microstructures.

9. The optical waveguide according to claim 8, wherein relative to the second flat surface, a slopes of the plurality of third inclined surfaces are less than or equal to a slope of the plurality of fourth inclined surfaces.

10. The optical waveguide according to claim 9, wherein the plurality of second light-guiding elements are disposed on the plurality of first inclined surfaces or the plurality of third inclined surfaces, and the plurality of second light-guiding elements are a plurality of long strips or a circular array.

11. The optical waveguide according to claim 9, wherein a range of an orthographic projection of a range of the plurality of second light-guiding elements on the second surface is less than or equal to an area of an orthographic projection of the plurality of first inclined surfaces or the plurality of third inclined surfaces on the second surface.

12. The optical waveguide according to claim 8, wherein the first flat surface and the second flat surface are complementary, the plurality of first inclined surfaces and the plurality of third inclined surfaces are complementary, and the plurality of second inclined surfaces and the plurality of fourth inclined surfaces are complementary, thereby enabling the second structural layer to be attached to the first structural layer.

13. The optical waveguide according to claim 8, wherein the first light-guiding element is disposed on the first flat surface or the second flat surface, and the first light-guiding element is rectangular or is a circular array.

14. The optical waveguide according to claim 8, wherein a range of the first light-guiding element is less than or equal to an area of the first flat surface or the second flat surface.

15. The optical waveguide according to claim 1, wherein the optical waveguide further comprises a third structural layer and a fourth structural layer, wherein
the third structural layer comprises a fifth surface and a sixth surface, wherein the fifth surface is opposite to the sixth surface, and the fifth surface has a plurality of first V-shaped inclined surfaces,
the fourth structural layer comprises a seventh surface and an eighth surface, wherein the seventh surface is opposite to the eighth surface, and the seventh surface has a plurality of second V-shaped inclined surfaces that are complementary to the plurality of first V-shaped inclined surfaces, thereby enabling the fifth surface of the third structural layer to be attached to the seventh surface of the fourth structural layer,
wherein the image beam enters the optical waveguide from the eighth surface, and the plurality of first sub-beams are formed by the plurality of first V-shaped inclined surfaces or the plurality of second V-shaped inclined surfaces, thereby enabling the image beam to expand in a second direction.

16. The optical waveguide according to claim 15, wherein the sixth surface of the third structural layer is attached to the coupling inclined surface of the first structural layer, thereby allowing the plurality of first sub-beams to enter the first structural layer from the coupling inclined surface.

17. The optical waveguide according to claim 15, wherein the sixth surface of the third structural layer is attached to the fourth surface of the second structural layer, thereby allowing the plurality of first sub-beams to enter the second structural layer from the fourth surface.

\* \* \* \* \*